United States Patent [19]
Knoll

[11] Patent Number: 5,791,667
[45] Date of Patent: Aug. 11, 1998

[54] WHEELBARROW FOR TRANSPORTING CIRCULAR BUCKETS

[76] Inventor: Bryce Knoll, 1815 N. Edgemont St., Los Angeles, Calif. 90027

[21] Appl. No.: 709,306

[22] Filed: Sep. 9, 1996

[51] Int. Cl.[6] .................................................. B62B 1/18
[52] U.S. Cl. ................................ 280/47.19; 280/47.31; 280/79.5
[58] Field of Search .................................. 280/652, 653, 280/47.3, 47.31, 47.32, 47.33, 47.19, 79.5

[56] References Cited

U.S. PATENT DOCUMENTS

| | | | |
|---|---|---|---|
| 2,840,384 | 6/1958 | Bard | 280/79.5 X |
| 2,855,210 | 10/1958 | Joyce | 280/47.19 |
| 3,292,795 | 12/1966 | Chappell | 280/47.19 X |
| 4,055,354 | 10/1977 | Sharpe | 280/47.31 |

Primary Examiner—Brian L. Johnson
Assistant Examiner—Michael Mar
Attorney, Agent, or Firm—Erik M. Arnhem

[57] ABSTRACT

A wheelbarrow has special compartments for containing individual circular buckets that may be loaded with different bulk materials, either liquid or solid. Materials can be segregated into different buckets and transported together in a single trip of the wheelbarrow. Each bucket can be removed separately from the wheelbarrow, such that it is not necessary to dump or discharge the entire contents of the wheelbarrow in one dumping operation. The individual buckets can in some cases be more easily manipulated for precisely pouring the contents, as compared to the manipulation possible when discharging material from a wheelbarrow.

5 Claims, 3 Drawing Sheets

WHEELBARROW FOR TRANSPORTING CIRCULAR BUCKETS

BACKGROUND AND SUMMARY OF THE INVENTION

This invention relates to a wheelbarrow, and especially a wheelbarrow designed to transport circular buckets containing solid or liquid materials.

Conventional wheelbarrows are in some cases not fully effective for transporting bulk materials from one location to another location. For example, liquid materials tend to slosh and overflow the side edges of the wheelbarrow during the transport phase, especially if the wheelbarrow has to transverse bumpy or rough terrain. Also, it is sometimes difficult to remove bulk materials from a conventional wheelbarrow, particularly when the unloading operation is to be performed in cramped or relatively inaccessible locations.

Also, the conventional wheelbarrow has a single dish-like compartment, so that only one material can be transported during any given trip; the conventional wheelbarrow does not permit different materials to be segregated and carried together from one location to another location in a single trip.

A further difficulty is that the conventional wheelbarrow cannot be readily cleaned without allowing the excess waste product to be dumped on the terrain; typically the wheelbarrow is cleaned by spraying water onto the wheelbarrow surface while the wheelbarrow is standing on end, such that waste products are caused to flow out of the wheelbarrow onto the ground. If the waste products are hazardous there can be an environmental problem.

The present invention is directed to a wheelbarrow having a series of compartments or chambers adapted to removably receive standard size buckets. Typically each bucket is a five gallon cylindrical bucket having a height of about fourteen inch and a diameter of about eleven inch. Each bucket is tapered slightly from top to bottom to permit easy telescopic stacking of the empty buckets. Each bucket has a bail (handle) for bucket-lifting purposes.

The wheelbarrow has one or more bucket-retention mechanisms, that include a lower bucket-support platform and an upper bucket-confinement wall structure designed to prevent lateral shifting of the associated bucket while the wheelbarrow is moving from one location to another location. At the destination point each loaded bucket is lifted out of the specially-designed wheelbarrow for storage, pouring or other disposition of the bulk material.

The wheelbarrow can be used in various different areas, e.g. by construction workers, warehouse personnel, gardeners, homeowners, farmers, and retail stores.

The wheelbarrow can be constructed in various different sizes, e.g. a relatively small wheelbarrow designed to carry two buckets, a medium sized wheelbarrow designed to carry four buckets, or a large sized wheelbarrow designed to carry six buckets.

Further features of this invention will be apparent from the attached drawings and description of illustrative embodiments of the invention.

THE DRAWINGS

DESCRIPTION OF A PREFERRED EMBODIMENT OF THE INVENTION

Figure 1:
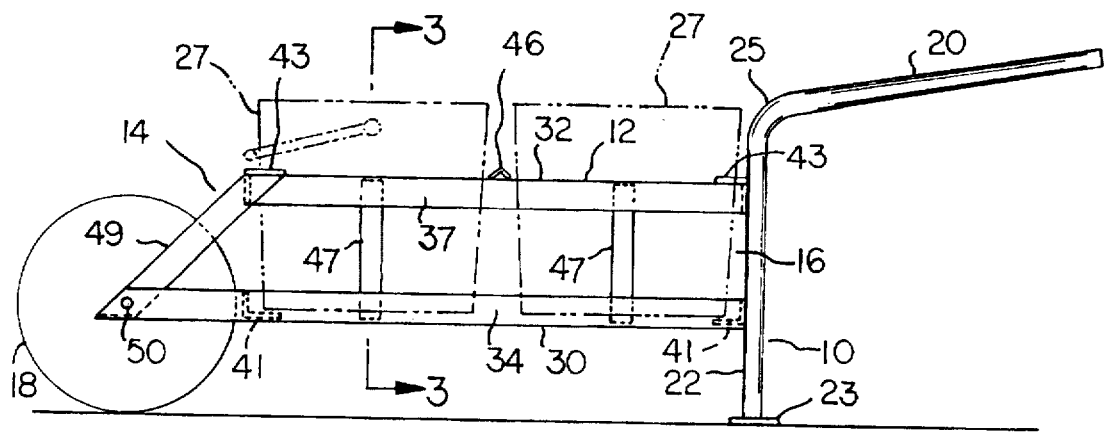
FIG. 1 is a side elevational view of a wheelbarrow embodying the invention.
Figure 4:
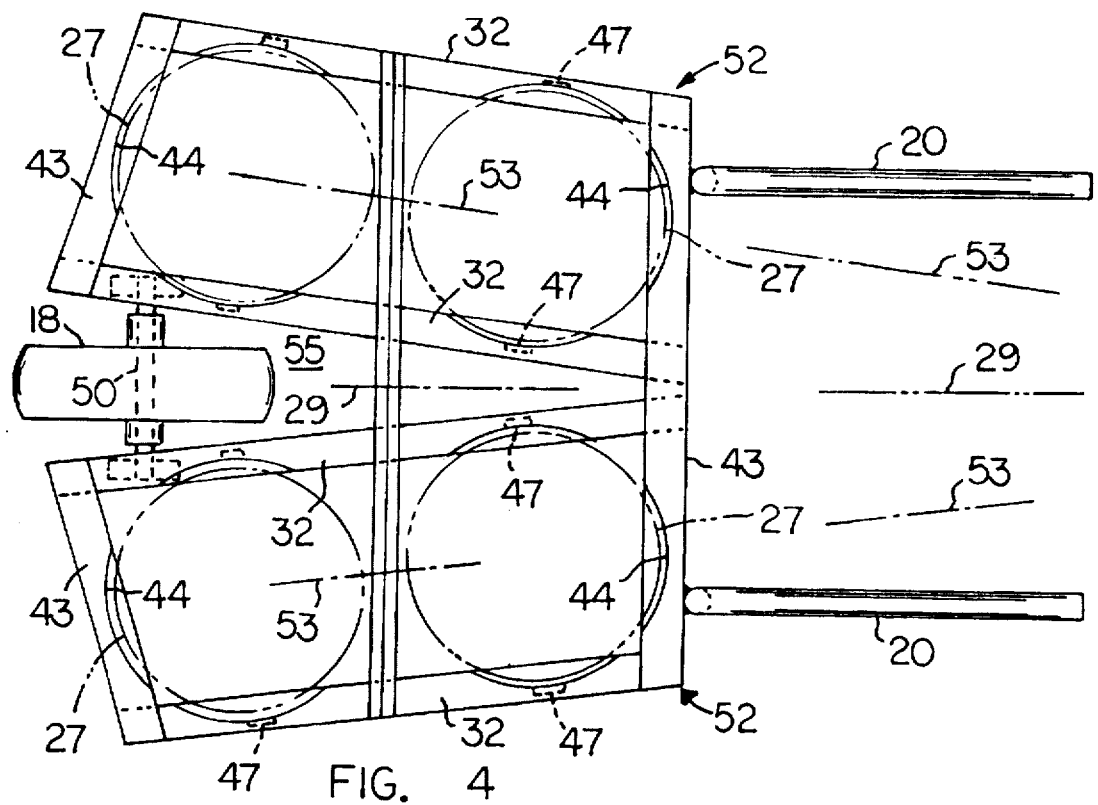
FIG. 4 is a top plan view of another larger wheelbarrow constructed according to the invention.
Figure 6:
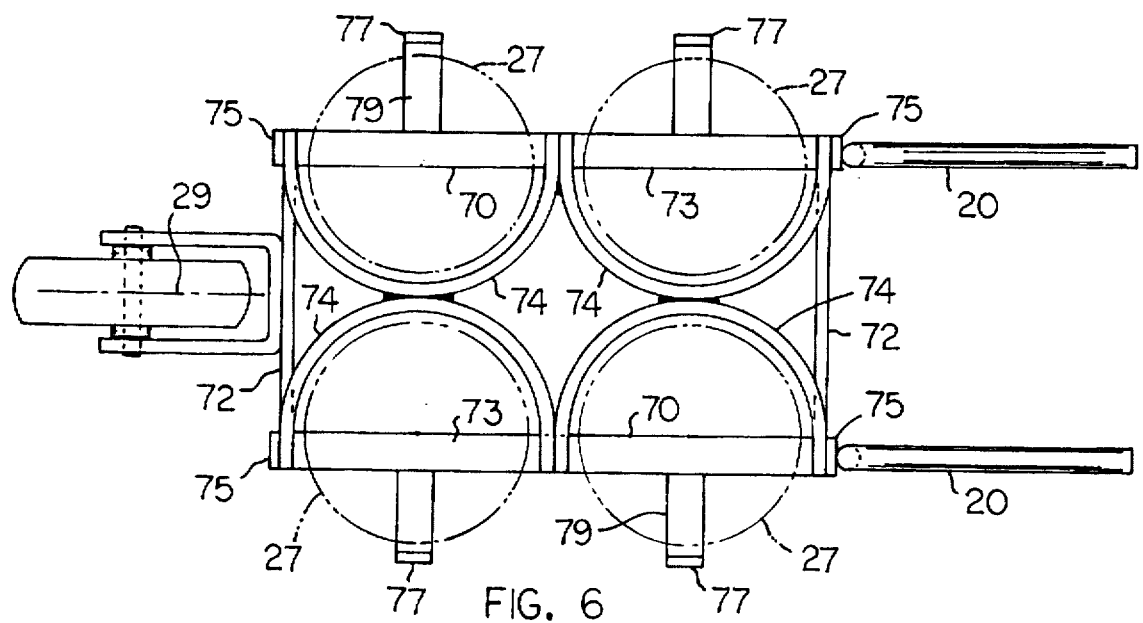
FIG. 6 is a top plan view of a further form that the invention could take.

FIGS. 1 and 4 show preferred forms of the invention. FIG. 6 is an additional construction added merely for illustration purposes to show another form that the invention could take, in extended practice of the invention.

Referring to FIG. 1, there is shown a wheelbarrow 10 that comprises a frame 12 having a front end 14, a rear end 16, a single ground wheel 18 at the frame front end, and a pair of lifting handles 20 extending from the frame rear end.

Each lifting handle can be formed out of a metal tube 25 bent into an L-shape, as shown in FIG. 1, whereby the downwardly-extending portion of the L forms a support leg 22 for the wheelbarrow when the wheelbarrow is standing alone. In the at-rest condition, the wheelbarrow has a three point support, namely ground wheel 18 and the two support legs 22. Each leg can have a circular pad 23 at the lower end to prevent the leg from sinking into soft ground. Each L-shaped metal tube 25 can be welded to the rear end of frame 12.

Frame 12 forms a bucket-retention means for two conventional five cylindrical gallon buckets, usually formed of a rigid plastic material. Numeral 27 references the two buckets supported on frame 12 between ground wheel 18 and lifting handles 20. Both buckets are centered on the frame longitudinal centerline 29 that is coincident with the rotational plane of ground wheel 18.

Frame 12 comprises two lower longitudinal rails 30 and two upper longitudinal rails 32 located directly above rails 30. These rails are located equidistant from the frame longitudinal centerline 29, whereby the cylindrical buckets 27 are centered on the rolling plane of the ground wheel 18. Each lower rail 30 has a right angle cross section that includes a horizontal leg 33 and an upstanding vertical leg 34. The bucket 27 has edge portions of its bottom surface resting on horizontal legs 33 of the two rails 30.

Each upper rail 32 has a right angle cross section that includes a horizontal wall 36 and a downwardly extending vertical wall 37. Each upper rail 32 has two arcuate segmental cut outs 39 in its horizontal wall, designed to conform to the curvature of the bucket side wall, whereby the two buckets 27,27 are confined against lateral shifting in frame 12.

The two lower rails 30,30 form a bucket-support platform. The two upper rails 32 form a bucket confinement means. The bucket load is carried by rails 30,30.

The four rails 30,30,32,32 can be connected together in various different ways. As shown in the drawing, lower rails 30, 30 are connected together by two transverse angle members 41. Each angle member 41 has a horizontal wall portion that can engage a bottom surface of an associated bucket 27, thereby providing additional support for the bucket. However angle members 41 serve primarily as connectors between rails 30,32; the rails can support the buckets without connector members 41.

Upper rails 32,32 are connected together by two angle members 43,43. Each angle member 43 has an arcuate cut-out 44 in its horizontal leg, conforming to the side surface contour of the associated bucket 27. Each cut out 44 thus serves as a bucket retention mechanism in the same fashion as segmental count outs 39 in rails 32,32. However, the primary function of each angle member 43 is to provide a rigid connection between rails 32,32. The buckets 27 can be retained against lateral shifting by the cut-outs 39; cut outs 44 are not essential for that function. Cut outs 44 slightly reduce the overall length of frame 12 in that the connectors 43 can be relatively wide in the horizontal plane without spacing the buckets 27 unnecessarily.

Upper rails 32,32 are also connected together by a transverse angle member 46. Member 46 also acts as an additional separating means for keeping the two buckets slightly spaced apart. The various segmental cut outs 39 and 44 form imaginary circles slightly larger than the circular buckets 27,27, whereby the buckets are precluded from shifting laterally any significant distance. The arc of the cut outs is slightly greater than the bucket surface curvature in order to take care of manufacturing tolerances, and to permit easy insertion and removal of the buckets.

Each lower rail 30 is connected to the corresponding upper rail 32 by two vertical metal straps 47. As shown in the drawing, straps 47 are located in transverse diametrical planes taken through the bucket axes, such that the straps act as guides when the buckets are being lowered onto rails 30. However, straps 47 could be located at other points along the lengths of rails 30 and 32 while still performing the connector function.

Rails 30 are also connected to rails 32 by the support legs 22 and two front angle elements 49. Ground wheel 18 has a fixed support shaft 50 attached to the overlapped ends of angle elements 49 and rails 30.

Figure 2:
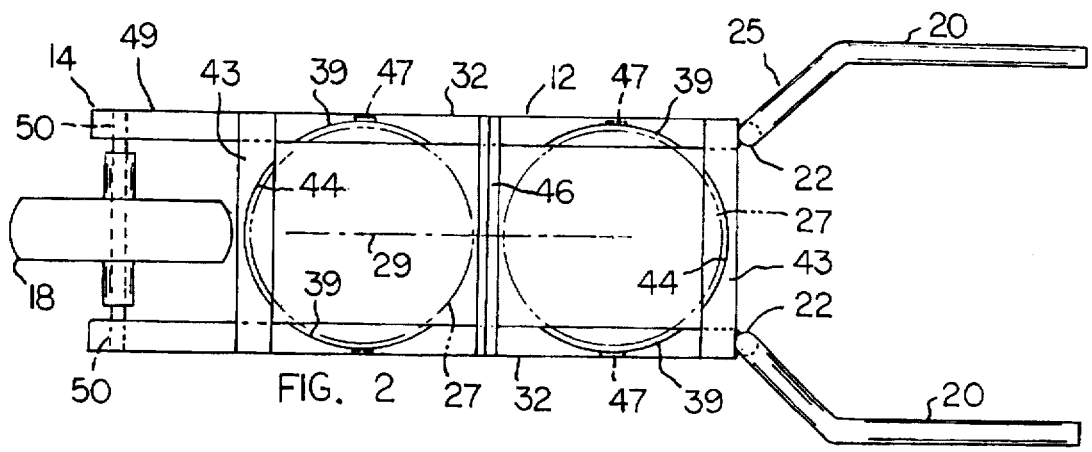
FIG. 2 is a top plan view of the FIG. 1 wheelbarrow.

The wheelbarrow depicted in FIGS. 1 and 2 is adapted to support two standard five gallon circular buckets while the wheelbarrow is moved from one location to another location. Rails 30,30 provide a support platform for the two buckets. Upper rails 32,32 provide a bucket confinement means for preventing lateral shift of either bucket.

By increasing the lengths of rails 30 and 32 it is possible to increase the bucket-carrying capacity of the wheelbarrow. For example, by increasing the length of each rail 30,32 a distance of about fifteen inch, the wheelbarrow can accommodate three buckets instead of two.

Figure 3:
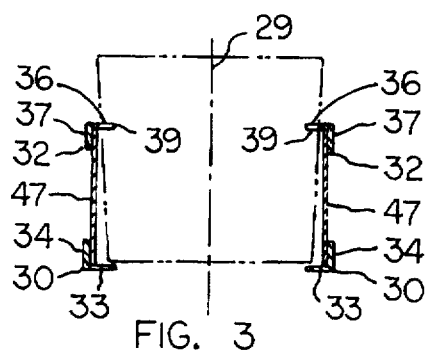
FIG. 3 is a transverse sectional view taken on line 3—3 in FIG. 1.
Figure 5:
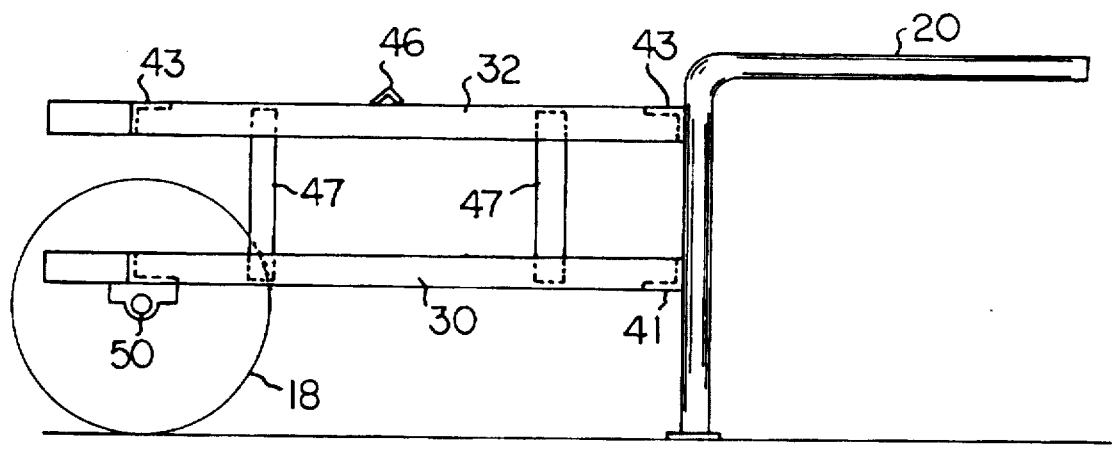
FIG. 5 is a side elevational view of the wheelbarrow shown in FIG. 4.

FIGS. 4 and 5 show another wheelbarrow embodying the invention, capable of supporting four circular buckets 27. In this case the wheelbarrow frame comprises two separate bucket-retention assemblies located on opposite sides of the frame longitudinal centerline 29. In FIG. 4 each bucket-retention assembly is designated by numeral 52. Each bucket-retention assembly comprises a lower bucket-support platform and an upper bucket-confinement structure constructed generally similarly to the corresponding structures shown in FIGS. 1 through 3. Similar reference numerals are applied to corresponding components in FIGS. 4 and 5 versus FIGS. 1 and 2.

Each bucket-retention assembly 52 has a longitudinal centerline 53 that is acutely angled to frame centerline 29 at an acute angle, such that centerlines 53,53 diverge in the forward direction to form a central space or compartment 55 for accommodating the ground wheel 18. The purpose in this arrangement is to bring the ground wheel back into the frame so as to reduce the overall length of the wheelbarrow. A shorter wheelbarrow may be easier to manipulate in some situations, e.g. where space is limited for turning or maneuvering.

In major respects the frame structures of FIGS. 4 and 5 are similar to the structure of FIGS. 1 and 2. Therefore, a detailed description of FIG. 4 is not thought to be necessary. The FIG. 4 wheelbarrow can be lengthened to accommodate six buckets (rather than four); thus each bucket-retention assembly 52 can be lengthened to accommodate three buckets instead of two.

The frame structure in any of the described embodiments can be formed or assembled together in various different ways, using various structural elements, e.g. angle members, square tubes, rods, round tubes, stampings, channel members, or bar stock. FIGS. 1 through 5 are representative of one construction, using primarily angle members as the primary frame components.

Figure 7:
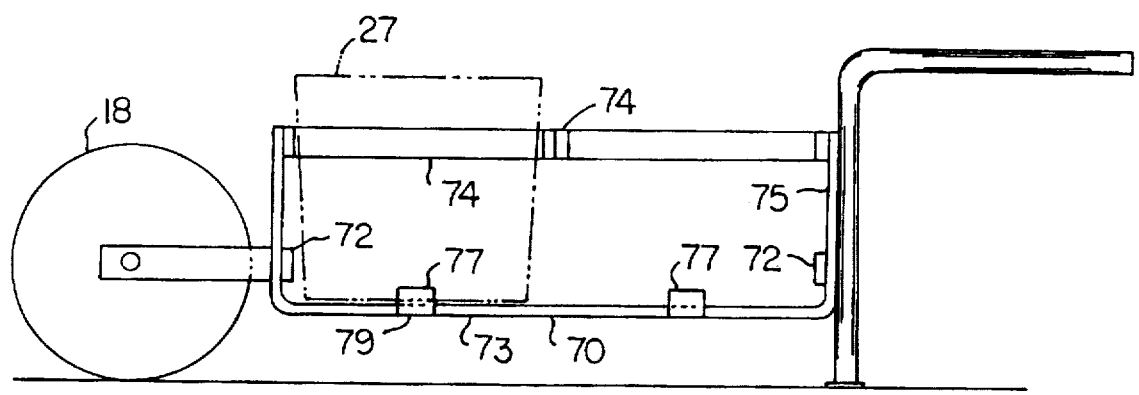
FIG. 7 is a side elevational view of the FIG. 6 construction.

FIGS. 6 and 7 show a somewhat different arrangement, using bar stock as the primary frame components. The FIG. 6 wheelbarrow is adapted to support four circular buckets 27 in an arrangement generally similar to the arrangement depicted in FIG. 4.

Referring to FIGS. 6 and 7, the bucket-support platform comprises two U-shaped bars 70 connected together by two transverse bars 72. The horizontal web portion 73 of each U-shaped bar acts as a support surface for two buckets 27,27.

The buckets are retained against lateral shifting by a bucket confinement means that comprises four arcuate bars 74 connected to each other and to the upper ends of the vertical bar portions 75 of U-shaped bars 70, as by welding. Arcuate bars 74 prevent the buckets from shifting longitudinally.

The buckets can be prevented from shifting laterally (i.e. away from frame centerline 29) by means of upstanding lips 77 formed on the outer ends of horizontal bars 70; each bar 79 is welded to a web portion 73 of one of the U-shaped bars 70.

As shown in FIG. 6, each arcuate bar 74 extends around approximately one half of the bucket circumference. In an alternate arrangement (not shown), each arcuate bar 74 could be replaced with a circular ring-type bar adapted to fully encircle the associated bucket 27. The illustrated arrangement may be somewhat cheaper. Also, with the illustrated arrangement, each bucket has to be lifted only a relatively short distance in order to separate the bucket from the wheelbarrow (i.e. the height of lip 77). In some cases this could be an advantage.

The invention contemplates a wheelbarrow having at least one bucket retention means that includes at least one lower bucket-support platform and an upper bucket confinement mechanism for each platform, whereby each bucket is individually retained against inadvertent tipping or shifting. As indicated above, the invention can be practiced in various forms and configurations.

What is claimed is:

1. A wheelbarrow for transporting circular buckets comprising: a frame, a pair of handlebars, and a single wheel positioned for rotation along a central longitudinal axis of the wheelbarrow, said frame including two separate bucket retention assemblies located along opposite sides of the central longitudinal axis, each bucket retention assembly including lower platform means formed by first and second parallel longitudinal rails, third and fourth parallel longitudinal rails spaced apart a distance less than a diameter of a bucket to be transported by the assembly and located above said first and second rails respectively, each of said third and fourth rails having an arcuate segmental cut-out shaped to conform to a curved sidewall of the bucket to be transported, a lower rearward rail attached to rearward ends of the first and second rails of the two bucket retention assemblies, and an upper rearward rail attached to rearward ends of the third and fourth rails of the two bucket retention assemblies, the lower and upper rearward rails extending transversely to said central longitudinal axis, said handlebars being attached to said lower and upper rearward rails and extending rearwardly therefrom, and said bucket retention assemblies having longitudinal centerlines which diverge outwardly from the central longitudinal axis to form a triangular-shaped area therebetween having an apex at a rearward end and an open forward compartment for receiving and rotatably supporting said wheel.

2. The wheelbarrow of claim 1, wherein each bucket retention assembly includes a lower forward rail interconnecting forward ends of said first and second rails and an upper forward rail interconnecting forward ends of said third and fourth rails.

3. The wheelbarrow of claim 1, wherein each of said first and second rails has an angle cross section that includes a horizontal leg and an upstanding vertical leg, each horizontal leg forming a bucket support surface.

4. The wheelbarrow of claim 3, wherein each of said third and fourth rails has an angle cross section that includes a horizontal wall and a downwardly extending vertical wall, said arcuate segmental cut-outs being formed in said horizontal walls.

5. The wheelbarrow of claim 4, wherein said longitudinal rails are of sufficient length to retain at least two circular buckets in each on of said bucket retention assemblies.

* * * * *